United States Patent Office 3,317,589
Patented May 2, 1967

3,317,589
ALKALI METAL SULFO-N-ALKYLPROPION-
AMIDES
Emil Alfred Vitalis, Springdale, and Michael Joseph
D'Errico, Stamford, Conn., and Winfried Josef Fre-
muth, Frankfurt, Germany, assignors to American Cy-
anamid Company, Stamford, Conn., a corporation of
Maine
No Drawing. Filed Apr. 19, 1963, Ser. No. 274,342
2 Claims. (Cl. 260—513)

This application is a continuation-in-part of our co-pending application, Ser. No. 111,463, filed May 22, 1961, and now abandoned.

The present invention relates to alkali metal sulfo-N-alkylpropionamides prepared by sulfonating N-alkylacrylamides produced by the Ritter reaction and to compositions containing said alkali metal sulfo-N-alkylpropionamides.

Compounds similar to those prepared by the process of the present invention have been known heretofore, as was their use as dispersing, lathering or wetting agents, particularly in the treating of textiles. Such compounds are thus described in U.S. Patent No. 2,009,346. These compounds, described therein as amido sulfonic acids and described herein as either straight chain propionamides or alkali metal sulfo-N-n-alkylpropionamides, are said to be prepared by reacting suitable straight chain amines with halogenated carboxylic acids, followed by substituting a sulfonic group for a halogen atom. Our experience is that the described synthesis is difficult at best, and, to the extent operable has the disadvantage of employing expensive starting materials and is not readily adaptable to a commercial scale. Moreover, sodium chloride and hydrogen chloride would be formed as a result of the reaction, which by-products would produce severe corrosion problems.

While it would be assumed that the straight chained propionamides would be similar to the compounds of this invention described herein as either branched chained propionamides or alkali metal sulfo-N-alkylpropionamides, there are in fact some very marked and surprising differences between them. Thus, the branched chained propionamides of this invention are characterized by excellent surfactant properties, including surprisingly good solubility in water, excellent foaming and emulsion stability, when compared with comparable straight chained propionamides.

Accordingly, it is an object of this invention to provide novel branched chained propionamides which are characterized by excellent surfactant properties when compared with homologous straight chained propionamide, particularly in surfactant properties that are important in cleaning and detergent formulations, such as solubility in water, foaming and emulsion stability.

It is a further object of the present invention to provide a process for preparing branched chained propionamides, which employs readily available raw materials, in a procedure which is economical and easy to control.

It is a further object of the present invention to provide surfactant compositions or formulations containing said branched chained propionamides.

These and other objects and advantages of the present invention will become more apparent from the detailed description thereof set forth hereinbelow.

In accordance with the present invention a process is provided which comprises reacting a branched chained acrylamide Ritter reaction product, wherein the alkyl group, prior to the Ritter reaction, is predominantly straight chain and is characterized by having at least 10 carbon atoms, and an alkali metal sulfite or bisulfite in the presence of polymerization inhibitor, said reaction being carried out in a solvent at temperatures of from 40° C. to 120° C. to form branched chained propionamides.

The sulfonation will normally be carried out at atmospheric pressure, though it may be carried out at subatmospheric or superatmospheric pressures.

The branched chained acrylamides employed in accordance with the present invention are prepared by employing the procedure described in the Ritter Patent No. 2,573,673, i.e., by reacting a suitable α-unsaturated nitrile and a suitable olefin in the presence of a cationoid substance, such as strong sulfuric acid, and hydrolyzing to the amide. Reactions of this general type are known and are generally referred to as Ritter reactions and the products formed therefrom as Ritter reaction products.

Interestingly, Ritter reaction products of the type contemplated for sulfonation in accordance with the instant invention are isomeric mixtures when long chain olefins derived from petroleum sources are employed in their preparation employing the Ritter reaction.

In the Ritter reaction, the double bond in the olefin, in the presence of the strong acid, will migrate along the alkyl chain, the extent of the migration depending upon the conditions such as temperature, acid concentration and time. Theoretically, at infinite times, the distribution of position of the double bonds would represent some equilibrium value, although it is not likely that a true equilibrium situation would be obtained because of limitations of time, etc. During the migration of the double bond, it is attacked by the nitrile and the position of the attack will determine the isomer which is produced in the Ritter reaction product, namely the branched chain acrylamides or N-alkylacrylamides. It has been found, for example, that in the reaction of hexadecene-1 using 90% sulfuric acid at 50° C. a VPC study has established the presence of at least five N-hexadecylacrylamide isomers. Under this particular set of conditions, there is about 47% of the 2-isomer, about 31% of the 3-isomer and about 22% of the 4, 5 and 6 compounds.

It will be understood that the particular composition of isomers obtained will depend upon reaction conditions. Thus, for example, if the olefin and sulfuric acid are allowed to stand for an appreciable time at elevated temperatures prior to the addition of the nitrile, the double bond will migrate and the extent of migration will increase with time. Therefore, it will be seen that the order and time of addition of the reactants in the Ritter reaction will to some extent govern the isomeric composition of the final branched chained acrylamide.

From a pure olefin such as described above, at least five isomers have been identified, and with more refined methods of analysis an even greater number of isomers may be noted in the final product. In starting with a mixture of olefins, for example, a mixture of C-11, 12, 13, 14 and 15 carbon atom olefins, as many as 20 or many more N-alkylacrylamide isomers may be found in the Ritter reaction product.

Because of the large number of products (isomers) in the branched chained propionamides of this invention, the solubility in water of our promionamides is very high. It is theorized that the presence of one isomer in solution tends to solubilize the other isomeric products present so that the large array of compounds work on each other synergistically and result in properties which one would not expect from a single pure compound where interactions of different isomers are not possible.

Since the original olefin undergoes isomerization, that is, migration of the double bond during the Ritter reaction, it will be evident that one can start with an olefin in which the double bond is not in the alpha position but also with an olefin in which the double bond is in an internal position. Thus, we believe that it is immaterial whether an α-olefin or one of its isomers is employed in the Ritter reaction. When the Ritter reaction takes place, the unsaturated nitrile attacks the double bond at some position in the chain. In this regard, the alkyl group may still be considered to be linear, even though the nitrogen atom attaches itself at an internal position in the linear alkyl group. One might also say that the alkyl group is branched at the point where it attaches to the nitrogen, but it will be understood that the alkyl group may still be referred to as linear.

To illustrate certain of the above facts relative to the presence of isomers and their distribution, the following typical example may be cited.

Hexadecene-1 (1 mole) and acrylonitrile (1 mole) are combined in the appropriate reaction vessel and the temperature of the mixture lowered to 0° C. by means of ice cooling. The sulfuric acid (90%, 2 moles) is then added slowly, maintaining the temperature at 0° C. On completion of the addition of the sulfuric acid, the temperature is gradually raised to 55° C. and the reaction is completed at this temperature. Water is then added to the system so that the acid concentration approximates 40% and the mixture is allowed to reflux for 10 hours, whereupon the mixture is neutralized with caustic and the amine isolated by normal procedures.

The following table shows variations in isomer content with variation in the manner in which the Ritter reaction is conducted.

olefins having from 11–15 carbon atoms, 11–20 carbon atoms are contemplated.

By "strong sulfuric acid" as that term is employed, it is meant sulfuric acid characterized by a strength of at least 90%, though preferably of a strength of from 95 to 100%. While other cationoid substances are contemplated which are capable of completely protonizing the double bond of the olefin, as a practical matter it has been found that this is best effected by strong sulfuric acid.

This reaction is preferably carried out at temperatures of from 40° C. to less than 90° C. The nitrile and olefin are normally employed in relative mole ratios of about 1:1, with the cationoid substance, as for example strong sulfuric acid, being employed in amounts extending from a relative amount of one mole to an excess.

After the preparation of the branched chained acrylamide, it may be separated and reacted with an alkali metal bisulfite or sulfite, such as sodium, potassium, lithium or ammonium bisulfite, preferably in a solvent medium. The alkali metal sulfites are preferably employed in a relative mole ratio per pole of the branched chain acrylamide of from 0.75 to 1.5 to 1. Preferably the mole ratio of alkali metal sulfite to acrylamide is from 0.9 to 1.1. Typically, this reaction is carried out on the acid side at the pH of the bisulfite. It is preferred that the reaction be carried out in a solvent medium, as for example water, water containing methanol, ethanol, propanol or the like, or these alcohols or their equivalents

| | Acid Conc., Percent | Temp., °C. | Moles of Reactants | | | Method of Addition | Isomer distribution from Hexadecene-1 | | |
|---|---|---|---|---|---|---|---|---|---|
| | | | H₂SO₄ | Acrylonitrile | Hexadecene | | 2 | 3 | 4–7 |
| 1 | 90 | 50 | 2 | 1.2 | 1 | H₂SO₄ added to olefin and acrylo.. | 47 | 31 | 22 |
| 2 | 90 | 0 | 2 | 1.2 | 1 | Acrylo. added to olefin, H₂SO₄ | 25.6 | 26.9 | 47.5 |
| 3 | 90 | 0 | 2 | 1.2 | 1 | As in 1 | 48.4 | 28.4 | 23.2 |
| 4 | 80 | 0 | 2 | 1.2 | 1 | do | 70.3 | 25.1 | 4.6 |

The relative ratios of the isomers were obtained by hydrolysis of the alkylacrylamides obtained from the Ritter reaction and vapor phase analysis of the amines.

The suitable α-unsaturated nitrile should be a material which when condensed with the α-unsaturated olefin is capable of sulfite addition at its unsaturated double bond. Principally such nitriles include acrylonitrile, α-substituted acrylonitrile, such as methacrylonitrile, α-chloroacrylonitrile and β-substituted acrylonitrile such as crotononitrile, β-chloroacrylonitrile and other equivalent materials.

Suitable olefins employed in the preparation of the branched chained acrylamides or isomeric Ritter reaction products in accordance with this invention are the olefins characterized by having at least 10 carbon atoms and up to 40 carbon atoms, and preferably from between 10 and about 20 carbon atoms. Preferably they are predominantly straight chain, that is, at least 75% straight chain. For detergent purposes, where solubility, foaming and stability of emulsion may be important, it has been found that the alkali metal sulfo-N-alkylpropionamides in which the alkyl group is a long straight chain having at least 10 carbon atoms is preferred. Such olefins and mixtures thereof are available from the petroleum industry.

As examples of suitable olefins, the following are illustrative: decene-1, undecene-1, dodecene-1, tri-decene-1, tetradecene-1, pentadecene-1, hexadecene-1, octadecene-1, telomers of propylene and butylene such as propylene tetramer, propylene hexamer, triisobutylene, tetraisobutylene, and mixtures of two or more of such olefins or their equivalents. Thus, mixtures or "cuts" of may be employed in the absence of water. Solvents are employed so that a uniform and homogeneous system is present at the beginning of the sulfonation reaction. Other solvents include butyl Cellosolve, glycols, dioxane and Varsol. The reaction is normally carried out at a temperature of from 40° C. to 120° C. and preferably at a temperature of from 60° C. to 110° C. The sulfonation reaction with an alkali metal bisulfite on the acid side normally requires from 10 to 20 hours for completion. Thereafter, the branched chained propionamides may be recovered in accordance with conventional procedures, as for example by removing solvent by distillation if a large concentration of a solvent was employed or other suitable means.

The reactions described herein are preferably carried out at atmospheric pressure, though subatmospheric, or superatmospheric temperatures may be employed.

The branched chain propionamide isomeric mixture reaction products prepared in accordance with this invention may contain substantial but minor amounts of branched chained alkali metal akyl sulfate characterized by the alkyl group being the same as the alkyl group in the branched chain propionamide. The presence of the branched chained alkali metal alkyl sulfate does not appear to adversely affect the detergency of the propionamide in a significant way and in fact may in some instances be helpful. The branched chained alkyl sulfate is formed during the preparation of the branched chained acrylamides and need not be separated from the acrylamide prior to the latter's sulfonation. If not separated from the acrylamide it is usually and preferably present in the final product in minor amounts, i.e., less than 50% by weight. Such compositions in which the alkyl group of both the branched chained alkali metal alkyl sulfate and the branched chained propionamide are long chain straight chain alkyl groups containing from 10 to about 20 carbon atoms are preferred.

As indicated hereinabove, the alkali metal sulfo-N-alkylpropionamides of the present invention have been found to be good detergents and to be characterized by excellent solubility in water, foaming, capable of forming good emulsions, and having good wetting properties. In addition, as detergents the Ritter reaction product branched chained propionamides of this invention have been found to be readily degraded by bacteria, as for example those normally found in septic systems, and the like. The inability of many detergents to be so degraded has, in many instances, greatly limited their utility.

With regard to the detergency of the branched chained propionamides of this invention, it should be noted that as a general rule sulfonated detergents are considered to be stable compounds but are not necessarily good detergents, a factor which is governed largely by the alkyl chain length. Sulfates, on the other hand, while being characterized as being good detergents, are in general not characterized by having good stability in acid solutions. The sulfonates of the instant invention are characterized both by good stability and good detergency, which is not true for all sulfonates, for example dodecyl sulfonate has poor detergency.

The Ritter reaction product branched chained propionamides of this invention may be employed in cleaning compositions such as detergent formulations, bleaching formulations and the like, and may be blended with builders, soil anti-redeposition agents, buffers, fillers, abrasives, suds boosters, fluorescent brighteners, oxidizing bleaches, perfumes, and the like. Examples of suitable builders employable in compositions with the branched chained propionamides of this invention include sodium tripolyphosphate, sodium hexametaphosphate, tetrasodium pyrophosphate, tetrasodium ethylene diamine tetraacetate, and the like. Soil anti-redeposition agents employable include carboxymethyl cellulose, cyanoethylated polysaccharides, as for example starches, while typical buffers include sodium silicate, sodium carbonate, sodium borate, and as fillers materials such as sodium sulfate, clay, diatomaceous earth, silica, starch and the like may be employed. In addition, suds boosters such as laurylethanolamide, anti-tarnishing agents such as melamine, benzotriazole and 2-mercaptothiazoline may be employed.

Cleaning compositions contemplated by this invention may contain from 1% to about 80% of the alkali metal sulfonated N-alkylpropionamides of this invention, depending upon the intended use of the composition.

Typical formulations employing the detergents of this invention might be as follows:

| | Percent |
|---|---|
| Alkali metal sulfo - N - alkylpropionamide (detergent) | 5 to 40 |
| Sodium tripolyphosphate (builder) | 5 to 50 |
| Carboxymethyl cellulose (soil anti-redeposition agent) | 0.25 to 5.0 |
| Sodium silicate (buffer, corrosion inhibitor) | 1 to 10 |
| Sodium sulfate (filler) | 1 to 90 |
| Melamine (anti-tarnish agent) | 0.1 to 1.0 |
| Laurylethanolamide (foam stabilizer) | 0.5 to 5.0 |
| Brighteners | 0.01 to 0.1 |

The branched chained propionamides of this invention may be employed in combination with other detergents, including both soap and non-saponaceous materials known to those skilled in the art, such as alkylaryl sulfonates, sodium lauryl sulfates, nonyl phenol ethylene oxide adducts, alkylamide polyols, alkali and alkaline earth fatty acids, and the like.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

Sodium β-sulfo-N-dodecylpropionamide 24 g. (0.1 mole) N-dodecylacrylamide (prepared by employing in the Ritter reaction dodecene-1), 10.5 g. (0.055 mole) sodium metabisulfite, 180 ml. 2β-ethanol, 80 ml. water and approximately 0.2 g. hydroquinone were mixed in a 500 cc. round bottom flask which was equipped with a reflux condenser.

This mixture was refluxed for 20 hours. Then the hot solution was filtered and left standing until waxy crystals separated. This solid was filtered off, washed and dried. The yield was 33.5%.

Upon further cooling of the filtrate another crop (7.9%) was obtained. Total yield: 41.4%.

EXAMPLE 2

Sodium β-sulfo-N-hexadecylpropionamide 26.5 g. (0.1 mole) N-hexadecylacrylamide (prepared by employing hexadecene-1 in the Ritter reaction), 10.5 g. (0.055 mole) sodium metabisulfite, 180 ml. 2β-ethanol, 80 g. water, and approximately 0.2 g. hydroquinone were refluxed for 20½ hours.

The hot solution was then filtered and cooled. The total yield of product was 58.9%.

EXAMPLE 3

Sodium β-sulfo-N-octadecylpropionamide 32.3 g. (0.1 mole) N-octadecylacrylamide (prepared by employing octadecene-1 in the Ritter reaction), 10.5 g. (0.055 mole) sodium metabisulfite, 180 ml. 2β-ethanol, 80 g. water and 0.2 g. hydroquinone were refluxed together for 20½ hours. Product work-up as in previous examples. The yield was 43.3%.

EXAMPLE 4

53 g. (0.2 mole) N-hexadecylacrylamide (prepared by employing tetraisobutylene in the Ritter reaction), 21 g. (0.11 mole) sodium metabisulfite, 300 g. isopropanol, 160 g. water, and approximately 0.4 g. hydroquinone were refluxed for 30 hours or until 1 g. of the mixture gave a clear solution in 100 ml. of water.

The hot solution was then filtered hot and cooled to room temperature (73° F.). It was then filtered through a Büchner funnel at 73° F. to recover the crystallized product. The yield was 68%.

EXAMPLE 5

64.6 g. (0.2 mole) N-octadecylacrylamide (prepared by employing a propylene hexamer in the Ritter reaction), 30.6 g. (0.15 mole) sodium metabisulfite, 400 ml. 2β-ethanol, 120 g. of water and 0.4 g. hydroquinone were refluxed together for 20 hours. Product was crystallized as in previous example. The yield was 43%.

EXAMPLE 6

A detergency test was performed in a Tergotometer at 140° F. for 10 minutes on the formulations listed below. A total of 4 (4 x 4") cloths per Tergotometer vessel were used and these were two standard soiled cloths from Test Fabrics Incorporated consisting of cotton printed on one side with an artificial soil made up of such materials as carbon black, lard, starch and mineral oil, and two white cloths. The 1% solutions prepared from the formulations were diluted to the desired concentrations. Reflectance readings were taken at 600 mμ on a General Electric Reflectometer on all the cloths before and after washing. The results are set forth in Table I below.

TABLE I

| Detergent Used in Formulation | Amt. of 1% Sol. Used to Get Desired Conc. | pH | Percent Return to Original Reflectance, Test Fabric Cloths | Reflectance of White Fabrics in Wash |
|---|---|---|---|---|
| (1) Sodium-β-sulfo-N-dodecylpropionamide | 50/500=0.1% | 9.7 | 21.0 | 91 |
| (2) Sodium-β-sulfo-N-hexadecylpropionamide | 50/500=0.1% | 9.5 | 23.6 | 91 |
| (3) Sodium-β-sulfo-N-octadecylpropionamide | 50/500=0.1% | 9.5 | 27.8 | 92 |
| (4) Sodium lauryl sulfate | 50/500=0.1% | 9.5 | 26.5 | 91 |

In comparing the results obtained from this test, it may be noted that formulation No. 3 produced the best results out of the three formulations tested that employed sulfonated N-alkylacrylamides as detergents. Further, it should be noted that formulation Nos. 1–3 are equally as good as the sodium lauryl sulfate formulation at 0.1% concentration. As is well known, sodium lauryl sulfate is a standard in the detergent industry. The soil anti-redeposition properties as shown by the high reflectances of the white cloths for all three formulations employing sulfonated N-alkylacrylamides as detergents are equal to that of the sodium lauryl sulfate formulation.

EXAMPLE 7

Sodium-β-sulfo-N-dodecylpropionamide, sodium-β-sulfo-N-hexadecylpropionamide and sodium-β-sulfo-N-octadecylpropionamide were submitted to the Draves Sinking Time test, a measure of the wetting power of these compounds. This test, a standard test to determine relative wetting power, is the method described in the A.A.T.C.C. 1960 Yearbook. A 1.5 gm. hook was used in these tests.

The results of these tests are set forth in Table II below.

of salts and have excellent hard water tolerance. This renders these detergents highly suited for uses in environments for which a substantial percentage of the commercially available detergents are not entirely suited.

EXAMPLE 8

Preparation of sodium sulfo-N-alkyl ($C_{11}$–$C_{15}$) propionamide

One part of $C_{11-15}$ predominantly straight chain olefin fraction and one part of acrylonitrile are heated to 70° C. and 1.4 parts of 98% sulfuric acid are added in the presence of nitrogen. The addition temperature is 70°–80° C., and the mixture is heated for one hour at 80°–85° C. The Ritter reaction mixture is added to the sulfonation mixture, which contains 0.9 part of sodium sulfite, 1.4 parts of 50% sodium hydroxide, trace of di-tert.-butyl nitroxide, 550 g. of water and 50 ml. of isopropyl alcohol. The resulting mixture is refluxed for six hours in the presence of nitrogen.

The resulting mixture when spray dried yielded a light cream colored powder containing 58% active detergent and 42% sodium sulfate.

TABLE II

| | Conc., percent | Draves Test—Sinking Time in Seconds—Room Temp. | |
|---|---|---|---|
| | | 30° C. | 50° C. |
| Sodium-β-sulfo-N-dodecylpropionamide | 0.1 | 36 | 35.6 |
| Do | 0.075 | 63 | 673 |
| Do | 0.050 | 148 | 194.3 |
| Do | 0.025 | | 899.4 |
| Sodium-β-sulfo-N-tetradecylpropionamide | 0.1 | 12 | |
| Do | 0.075 | 19 | |
| Do | 0.050 | 27 | |
| Do | 0.025 | 65 | |
| Do | 0.020 | 75 | |
| Sodium-β-sulfo-N-hexadecylpropionamide | 0.1 | 43 | 24.4 |
| Do | 0.075 | 49 | 31.8 |
| Do | 0.050 | 68 | 46.8 |
| Do | 0.025 | 145 | 66.8 |
| Sodium-β-sulfo-N-octadecylpropionamide | 0.1 | 146 | 47.6 |
| Do | 0.075 | | 80.2 |
| Do | 0.050 | | 182.1 |
| Do | 0.025 | | 217.9 |
| Sodium propylene tetramer benzene sulfonate | 0.1 | 19 | |
| Do | 0.075 | 26 | |
| Do | 0.050 | 41 | |
| Do | 0.025 | 90 | |

Table II hereinabove demonstrates that the alkali metal sulfo-N-alkylpropionamides of this invention have highly desirable wetting properties, as may be seen by comparison with the result obtained with sodium polylene tetramer benzene sulfonate.

The alkali metal sulfo-N long chain alklpropionamides of this invetion are soluble in water even in the presence

EXAMPLE 9

Preparation of sodium sulfo-N-alkyl ($C_{11}$–$C_{20}$) propionamide

The same procedure as is described above is employed here except that a $C_{11}$–$C_{20}$ predominantly straight chain olefin fraction was employed instead of the $C_{11}$–$C_{15}$ olefin fraction.

The resulting mixture when spray dried yielded a light cream colored powder containing 71% active detergent and 29% sodium sulfate and other inert materials.

In the use of the above two materials, sodium sulfate limits the solubility of these detergents in organic solvents. In aqueous solutions the sodium sulfate also limits the solubility of the detergent in many formulations.

EXAMPLE 10

The branched chained propionamides prepared in Examples 8 and 9 were compared with sodium propylene tetramer benzene sulfonate, a well known and standard commercial detergent, to determine their relative solubility in salt solutions. The results of this comparison are set forth in Table III below.

TABLE III.—SOLUBILITY OF ALKALI METAL SODIUM SULFO-N-ALKYLPROPIONAMIDES IN SALT SOLUTIONS

| Salt | Grams of Salt to Produce Turbidity in 100 gr. of 1% Detergent Solution at 25° C. | | |
|---|---|---|---|
| | $C_{11}$-$C_{15}$ (alkyl) | $C_{11}$-$C_{20}$ (alkyl) | ABS* |
| Tetrapotassium pyrophosphate | 80 | 75 | 3 |
| Tetrasodium pyrophosphate | 6 | 6 | 3 |
| Sodium metasilicate | 20 | 36 | 3 |
| Magnesium chloride | >100 | >100 | 1 |
| Calcium chloride | 10 | 10 | <1 |

*Sodium propylene tetramer benzene sulfonate.

In order to further show the effect of the isomer distribution present in the Ritter amides (branched chained propionamides), the straight chained propionamide and the branched chained sulfate of comparable chain length whose preparations are described below were evaluated.

In order to demonstrate the effect of isomer distribution, the compound, 3-sulfo-N-n-hexadecylpropionamide (straight chained propionamide) of the type described in U.S.P. 2,009,346 was prepared and its surfactant properties compared with a sulfonated Ritter reaction product, 3-sulfo-N-hexadecylpropionamide (branched chained propionamide), contemplated by the present invention.

EXAMPLE 11

(A) *3-chloro-N-n-hexadecylpropionamide*

1.0 mole of hexadecylamine (Armour, Armeen 16D recrystalized from hexane) and 1.0 mole of triethylamine are dissolved in 1 liter of toluene, and this solution is added to 1.0 mole of β-chloropropionyl chloride in 4 liters of toluene. The temperature of the reaction mixture is maintained between −10° to −5° C. during the addition. The mixture is allowed to warm to room temperature and then is heated to 85°–90° C. The hot mixture is filtered to remove the triethylamine hydrochloride, and the filtrate is cooled. The resulting mixture is filtered, and the solid is recrystallized from acetonitrile.

*Analyses.*—Theory: N, 4.22; Cl, 10.68. Found: N, 4.43; Cl, 10.46.

(B) *N-n-hexadecylacrylamide*

To 1.0 mole of hexadecylamine (Armour, ARMEEN 16D recrystallized from acetonitrile) and 1.0 mole of triethylamine (D.P.I., redistilled from KOH) dissolved in 2700 ml. of toluene is added 1.0 mole of acrylyl chloride in 75 ml. of toluene. The temperature of the reaction mixture is kept between −6° and 2° C. during the addition. The mixture is allowed to warm to 30° C. and is filtered to remove the triethylamine hydrochloride. The filtrate is passed through a column of chromatographic alumina, and the solvent is then removed. The solid is recrystallized from hexane and analyzed.

*Analyses.*—Theory: N, 4.74; Iodine number, 85.9. Found: N, 4.65; Iodine number, 85.0.

(C) *Sodium 3-sulfo-N-n-hexadecylpropionamide*

1.0 mole of A or B and 1.0 mole of sodium sulfite are heated in 900 ml. of water and 900 ml. of isopropyl alcohol in the presence of hydroquinone. The mixture is heated under nitrogen at 80°–85° C. for 48 hours. The reaction mixture is filtered, cooled and refiltered. The final solid residue is recrystallized from 95% ethanol and analyzed.

*Analyses.*—Theory: N, 3.51; S, 8.02. Found: N, 3.57; S, 7.97.

Titration for anionic content—material too water insoluble to obtian titration.

EXAMPLE 12

(A) *N-hexadecylacrylamide*

1.0 mole of hexadecene-1 and 1.0 mole of acrylonitrile are heated to 70° C. and 1.4 moles of 98% sulfuric acid are added between 70°–80° C. The mixture is heated for 1 hour at 80°–85° C. and hydrolyzed by pouring onto ice water. The hydrolysis is completed by heating at 50° C. for ½ hour, and the mixture is made alkaline with 20% sodium hydroxide. The basic mixture is cooled to 10° C. and filtered. The filtrate is discarded, and the solid is heated with nitromethane to separate the acrylamide from the alcohol. The recrystallized acrylamide has a M.P. of 72°–75° C.

*Analyses.*—Theory: N, 4.74; Iodine number 85.9. Found: N, 4.58; Iodine number, 85.0.

(B) *Sodium-3-sulfo-N-hexadecylpropionamide*

1.0 mole of the acrylamide and 1.0 mole of sodium sulfite are heated in 900 ml. of water and 900 ml. isopropyl alcohol in the presence of hydroquinone. The mixture is heated under nitrogen at 80°–85° C. for 24 hours. Two layers are present, and the bottom alkaline layer is removed and discarded. The organic material is cooled to room temperature, filtered and recrystallized from 95% ethanol.

*Analyses.*—Theory: N, 3.51; S, 8.02. Found: N, 3.39; S, 8.25.

Titration for anionic content—100%.

EXAMPLE 13

*Sodium hexadecyl sulfate*

1.5 moles of 98% $H_2SO_4$ are added to 1.0 mole of hexadecene-1 at 70°–75° C. The reaction mixture is diluted with about ⅓ its volume of ice water, and the lower acidic layer is discarded. The upper layer is extracted with pentane to remove any alcohol, olefin or dialkyl sulfate, and the pentane extract is discarded. The extracted material is neutralized with sodium hydroxide and dried. The solid is extracted with hot butanol. The butanol extract is evaporated to dryness, and the residue is recrystallized from 95% ethanol.

*Analyses.*—Theory: C, 55.78; H, 9.66; S, 9.30. Found: C, 55.76; H, 9.33; S, 9.23.

Titration for anionic content—100%.

The relative solubilities of the straight chain (Example 11C) and branched chained (Example 12B) propionamides and the branched chained (Example 13) alkali metal hexadecyl sulfate were determined by obtaining a turbidity cooling curve in accordance with the following procedure.

One to five grams of product are placed in a tube and a small volume of water (10 cc. to 25 cc.) is added. The water is heated, while stirring, until the solution is clear. Its clarity of solution is not obtained at 100° C., more water is added until a clear solution is obtained at 90° to 100° C. The clear solution is allowed to cool slowly while stirring and the temperature recorded at the first appearance of turbidity. A small volume of water is added and the solution is again heated until a clear solution results. Then the temperature at which turbidity appears on cooling is again recorded. The cycle is repeated with successive additions of water, noting the temperatures at which turbidity appears.

The results of the turbidity curve demonstrated that the straight chain propionamide synthesized according to U.S. Patent No. 2,009,346, when dissolved in water, showed a turbidity at 100° C. when the amount of the compound was less than .04 g. per 100 g. of water. In contrast to this, the branched chained propionamide of this invention, containing a mixture of isomers, was soluble to the extent of 2 g. per 100 g. of water at temperatures as low as 46° C. At 40° C., the Ritter product became turbid when the solution contained about .6 g. 100 g. of water. It is evident that the solubility as determined by the turbidity measurement for the branched chained propionamide is some 60 to 200 times as soluble as the straight chain propionamide at temperatures of 50° to 60° C. This extraordinary improvement in solubility would be expected to enhance the surfactant performance of the products of this invention, it being well known that solubility is of extreme importance in detergency and other surfactant properties.

In the area of foaming, the effectiveness of the branched chained propionamides of this invention was demonstrated by comparing their performance with that of the straight chain propionamides described in U.S. Patent No. 2,009,346. Also, since the Ritter reaction contains branched chained alkyl sulfate produced to some extent as the Ritter reaction proceeds, we have also determined the foaming power of such a mixture as well as the foaming power of the branched chained alkyl sulfate. The mixture referred to contained 80% of the branched chained propionamide and 20% of the sulfate.

Foaming power was demonstrated by employing the following procedure:

50 grams of white mineral oil was added to 50 grams of a 1% surfactant solution in a graduated cylinder. The cylinder was then inverted three times and the foam height recorded. The results of this test in terms of the foam height expressed in milliliters demonstrate that the branched chained propionamide of this invention produced a foam height of 9 milliliters, while a combination containing 80% of said propionamide and 20% of branched hexadecyl sulfate demonstrated a foam height of 5 milliliters. The straight chained propionamide of the prior art and branched chained sulfate produced 0 milliliter of foam height.

It will be appreciated that foaming is important in cleaning compositions for use in dish washing, shampoos, hand soaps, shaving creams and the like. In addition, foaming is important for numerous purposes, such as fire fighting, flotation, oil well drilling, and the like.

The contamination of streams and water reserves in highly industrialized areas in the United States with synthetic detergents is becoming a major problem. The branched chained propionamides of this invention, because of their chemical nature, are readily destroyed through biological processes. The following data, obtained by employing the method described in the Journal of Applied Chemistry, vol. 5, page 517 (1955), demonstrates that over 98% of the branched chained propionamide of this invention, prepared as in Example 10, is decomposed within 5 days.

BIODEGRADATION OF BRANCHED CHAINED PROPIONAMIDES

| Example 10—Branched Chained ($C_{11}$–$C_{20}$) Propionamide, Days | Conc. (Expressed as p.p.m. Sodium 2-ethylhexyl sulfosuccinate) |
|---|---|
| 0 | 2.95 |
| 2 | 2.70 |
| 5 | 0.05 |

Good emulsification properties, including the ability to produce stable emulsions, are an extremely important property for a surfactant.

To demonstrate the excellent stability of the branched chained propionamides of this invention, the following test was carried out.

A 50 ml. 1% aqueous solution was prepared for the straight chain propionamide, the branched chained propionamide, the branched chained sulfate, and a mixture of branched chain propionamide and branched chained sulfate, containing 80% by weight of the former and 20% by weight of the latter, which are described above. An emulsion was made by passing the 1% solution and 50 ml. of a mineral oil through a hand homogenizer three times.

The straight chain propionamide emulsion broke after 24 hours at 25° C., as did the branched chained sulfate. The branched chained propionamide and the mixture of branched chained propionamide and branched chained sulfate were stable after one week.

We claim:

1. The alkali metal sulfo-N-alkylpropionamides prepared by sulfonating an isomeric mixture of N-alkylacrylamide prepared by the Ritter reaction, said Ritter reaction being carried out between an α-unsaturated nitrile and an olefin having at least 10 carbon atoms in the presence of a cationoid substance and thereafter hydrolyzing the resulting product to the corresponding amide, said sulfonation being effected by an alkali metal sulfite or bisulfite and said sulfo group being attached to the beta carbon atom of said alkali metal sulfo-N-alkylpropionamides.

2. The sodium sulfo-N-alkylpropionamides prepared by sulfonating with the sodium sulfite or sodium bisulfite an isomeric mixture of N-alkylacrylamide prepared by the Ritter reaction, said Ritter reaction being carried out between acrylonitrile and olefins having from 10 to 20 carbon atoms in the presence of a cationoid substance and thereafter hydrolyzing the resulting product to the corresopnding amide, said sulfonation being such that the sulfo group is on the beta carbon atoms of the resulting propionamides.

References Cited by the Examiner

UNITED STATES PATENTS

| 2,009,346 | 7/1935 | Schirm | 260—513 |
| 2,878,190 | 3/1959 | Dvorkovitz et al. | 252—152 |
| 2,992,994 | 7/1961 | Albrecht et al. | 252—152 |
| 3,009,950 | 11/1961 | Hennes | 260—513 |

OTHER REFERENCES

Migrdichian, Vartkes, "Organic Synthesis," vol. 1, 1957, page 713.

LORRAINE A. WEINBERGER, *Primary Examiner.*

ALBERT T. MEYERS, *Examiner.*

M. WEBSTER, *Assistant Examiner.*